United States Patent
Ogasawara

(10) Patent No.: US 8,471,929 B2
(45) Date of Patent: Jun. 25, 2013

(54) IMAGING APPARATUS AND IMAGE PROCESSING METHOD

(75) Inventor: Tsutomu Ogasawara, Funabashi (JP)

(73) Assignee: Canon Kabushiki Kaisha, Tokyo (JP)

( * ) Notice: Subject to any disclaimer, the term of this patent is extended or adjusted under 35 U.S.C. 154(b) by 356 days.

(21) Appl. No.: 13/020,724

(22) Filed: Feb. 3, 2011

(65) Prior Publication Data

US 2011/0193980 A1    Aug. 11, 2011

(30) Foreign Application Priority Data

Feb. 5, 2010    (JP) .................. 2010-024600

(51) Int. Cl.
| H04N 5/262 | (2006.01) |
| H04N 5/225 | (2006.01) |
| H04N 5/228 | (2006.01) |
| H04N 5/222 | (2006.01) |

(52) U.S. Cl.
USPC .............. 348/239; 348/220.1; 348/222.1; 348/240.2; 348/333.11; 348/333.12

(58) Field of Classification Search
USPC .... 348/207.99, 208.99–208.16, 218.1–222.1, 348/231.99–239, 240.99–240.2, 333.01–333.13; 382/162–167, 254–308
See application file for complete search history.

(56) References Cited

U.S. PATENT DOCUMENTS

| 6,560,374 | B1 | 5/2003 | Enomoto | |
| 2002/0008764 | A1* | 1/2002 | Nakayama | 348/239 |
| 2002/0140823 | A1* | 10/2002 | Sakurai et al. | 348/207.99 |
| 2002/0191100 | A1* | 12/2002 | Matsunaga et al. | 348/345 |
| 2003/0071905 | A1* | 4/2003 | Yamasaki | 348/239 |
| 2004/0051789 | A1 | 3/2004 | Horita | |
| 2005/0220358 | A1* | 10/2005 | Blonde et al. | 382/264 |
| 2006/0139477 | A1* | 6/2006 | Iijima | 348/345 |
| 2008/0106615 | A1* | 5/2008 | Ahonen et al. | 348/231.99 |
| 2008/0240517 | A1* | 10/2008 | Okamoto | 382/118 |
| 2009/0040321 | A1* | 2/2009 | Nakamura | 348/208.11 |
| 2009/0284613 | A1* | 11/2009 | Kim | 348/222.1 |
| 2009/0290046 | A1* | 11/2009 | Kita | 348/231.99 |
| 2010/0007759 | A1* | 1/2010 | Watanabe | 348/222.1 |
| 2010/0214437 | A1* | 8/2010 | Kim et al. | 348/223.1 |
| 2010/0231731 | A1* | 9/2010 | Motomura et al. | 348/208.4 |
| 2010/0265353 | A1* | 10/2010 | Koyama et al. | 348/222.1 |
| 2011/0193984 | A1* | 8/2011 | Kitaya et al. | 348/222.1 |

FOREIGN PATENT DOCUMENTS

| JP | 2000-069277 A | 3/2000 |
| JP | 2004-102904 A | 4/2004 |

* cited by examiner

*Primary Examiner* — Robert Velez
*Assistant Examiner* — Michael Osinski
(74) *Attorney, Agent, or Firm* — Canon U.S.A., Inc. IP Division

(57) ABSTRACT

An apparatus can generates an image having a dioramic special effect so as to have high quality in a still image recording mode and generates the image having the dioramic special effect speedily in a live image display mode. The apparatus generates one or more blurred images from a captured image and combine the captured image with at least one of the generated blurred images by changing in areas. The number of blurred images to be generated for the combination in the live image display is smaller than the number of blurred images to be generated for the combination in the still image recording.

17 Claims, 4 Drawing Sheets

IMAGING APPARATUS AND IMAGE PROCESSING METHOD

BACKGROUND OF THE INVENTION

1. Field of the Invention

The present invention relates to an image processing technique capable of blurring an image captured by an imaging apparatus with a solid-state image sensor.

2. Description of the Related Art

Conventionally, a dioramic shooting that captures an image including upper and lower blurred areas has been optically realized. An optical element capable of realizing the dioramic shooting is, for example, a special lens such as a tilt-shift lens that can be used to perform bird's-eye view shooting. Further, performing image processing on a captured image is useful to realize various blurring effects including dioramic effects. Japanese Patent Application Laid-Open No. 2000-69277 discusses a technique for mixing an ordinarily captured image (original image) with a blurred image derived from the original image at an appropriate ratio to obtain a soft focus effect. Further, as discussed in Japanese Patent Application Laid-Open No. 2004-102904, sequentially performing reduction, filtering, and enlargement processing on an ordinarily captured image is useful to acquire an appropriate blurred image.

However, when the image processing is employed to realize a high-quality dioramic still image, it is usual that blurring processing is performed by changing the degree of blur at a plurality of stages. On the other hand, display of dioramic images may be required when a live image is displayed during preparation for a still image shooting operation or when recording of moving images is performed. In this case, the image processing is performed in such a way as to realize real-time generation of dioramic images for numerous frames. Accordingly, if acquiring dioramic images appropriately in various shooting conditions is required, a processing speed tends to decrease and usage of a memory or other resources is restricted while high-quality images are required.

SUMMARY OF THE INVENTION

According to an aspect of the present invention, an apparatus that generates a display image to be displayed on a display unit and a recording image to be recorded in a recording unit based on a captured image obtained by an imaging unit includes a generation unit configured to generate a plurality of blurred images which are differentiated in a degree of blur from the obtained image, a combination unit configured to combine the captured image with at least one of the generated blurred images to generate the display image and the recording image, and a control unit configured to control the generation unit and the combination unit such as to set a number of images that are used to generate the display image to be smaller than the number of images that are used to generate the recording image.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
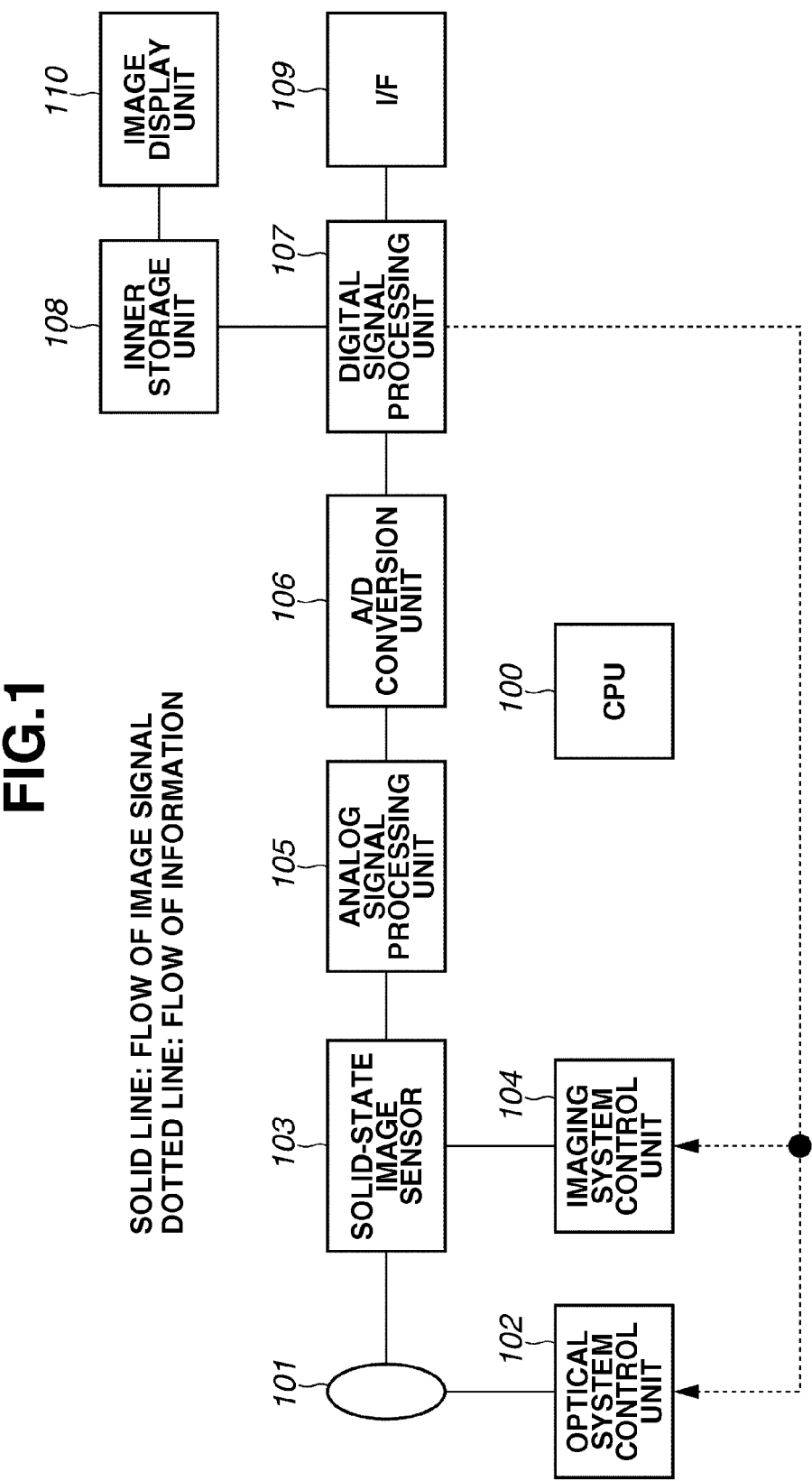
FIG. 1 illustrates an example configuration of an imaging apparatus according to an exemplary embodiment of the present invention.

FIG. 1 illustrates an example configuration of an imaging apparatus according to a first exemplary embodiment of the present invention.

An optical system 101 has a mechanism for focusing incident light on a solid-state image sensor 103 to form an image of a subject to be captured. An optical system control unit 102 can control various operations (e.g., exposure, zoom, focus, and optical shake-compensation) to be performed by the optical system 101. The solid-state image sensor 103 can convert a captured optical image into an electric signal. An imaging system control unit 104 is a control system capable of driving the solid-state image sensor 103. An analog signal processing unit 105 performs clamp and gain adjustment processing on an output signal of the solid-state image sensor 103. An analog/digital (A/D) conversion unit 106 can convert an analog image signal into digital image data to output as image data.

The optical system 101 and the above-described relevant constituent components 102 to 106 can cooperatively constitute an imaging unit according to the present exemplary embodiment. The imaging apparatus can perform a still image shooting operation in such a way as to record image data of a captured image output from the imaging unit in an external storage device (not illustrated) on a frame-by-frame basis. Further, the imaging apparatus can perform a moving image shooting operation in such a way as to continuously record a plurality of frames.

A digital signal processing unit 107 can perform image processing on an A/D converted digital signal of the captured image to generate an output image. An inner storage unit 108 can temporarily store the image data when the digital signal processing unit 107 performs the above-described output image generation processing. An interface (I/F) unit 109 is connected to an external storage device that can finally store the generated image data. An image display unit 110 is functionally operable as an electronic finder that can display the generated images as a live image. A central processing unit (CPU) 100 can control the above-described constituent components and can control various operations to be performed by the imaging apparatus as described below.

Figure 2:
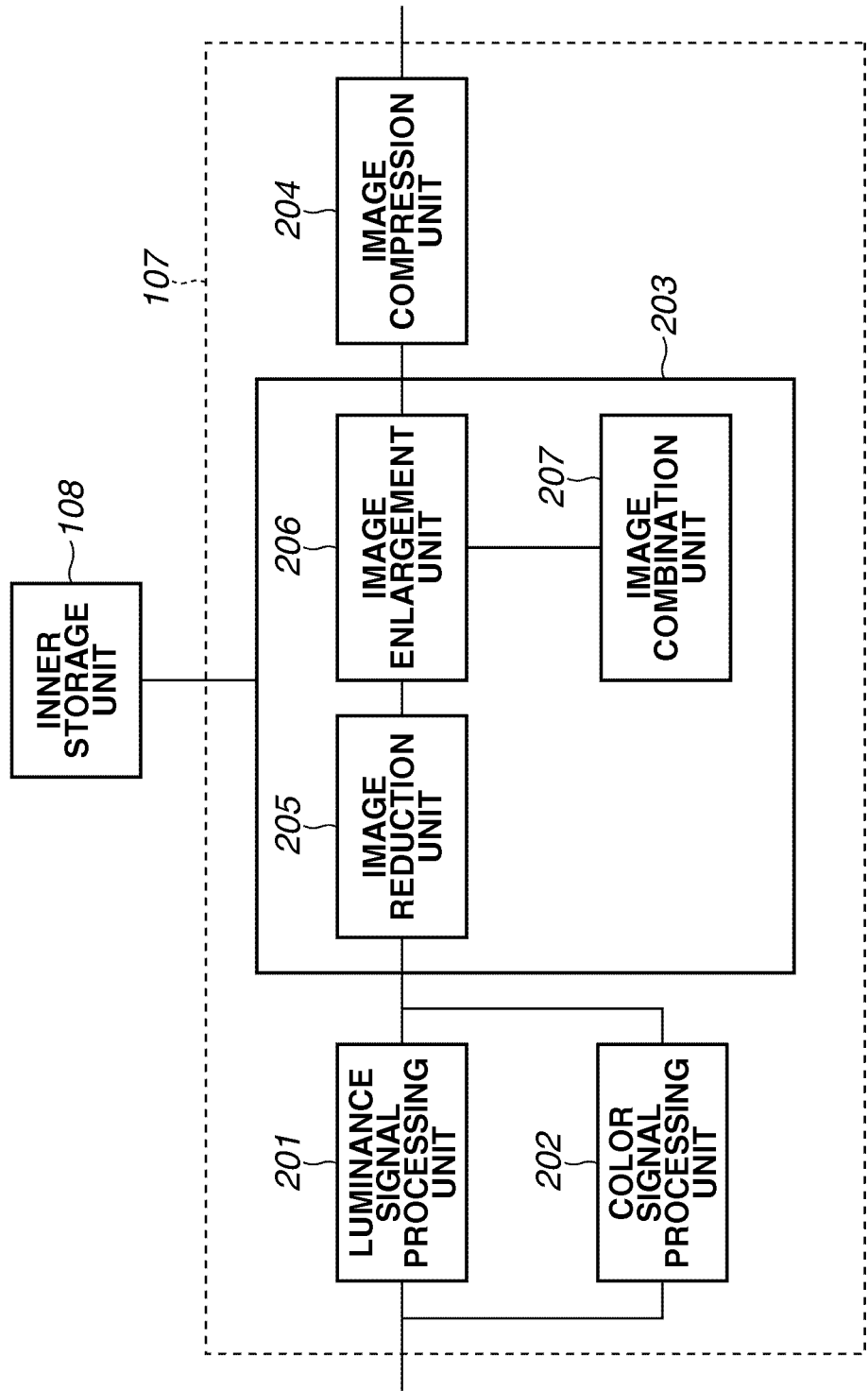
FIG. 2 is a block diagram illustrating an example configuration of a digital signal processing unit of the imaging apparatus according to an exemplary embodiment of the present invention.

FIG. 2 is a block diagram illustrating an example configuration of the digital signal processing unit 107 of the imaging apparatus according to the present exemplary embodiment.

A luminance signal processing unit 201 performs luminance signal processing on the image data of the captured image and outputs a luminance processed signal to a composite image generation unit 203. A color signal processing unit 202 performs color signal processing on the image data of the captured image and outputs a color processed signal to the composite image generation unit 203. The inner storage unit 108 can be used to temporarily store a composite image or to display a live image on the image display unit 110. An image compression unit 204 can compress image data received from the composite image generation unit 203 and can output compressed image data to an external storage device via the interface unit 109.

Further, the composite image generation unit 203 includes an image reduction unit 205 that can reduce an input image, an image enlargement unit 206 that can enlarge a reduced image, and an image combination unit 207 that can combine a plurality of processed images. Each of the above-described functional units 205 to 207 is connected to the inner storage unit 108.

In a normal shooting operation, the CPU 100 causes the above-described units 205 to 207 to perform reduction and enlargement processing on an input image according to a selected image size. Further, in the combination processing, the CPU 100 causes the inner storage unit 108 to temporarily store processed images if necessary while causing the above-described units 205 to 207 to perform the reduction and enlargement processing.

Figure 3A:
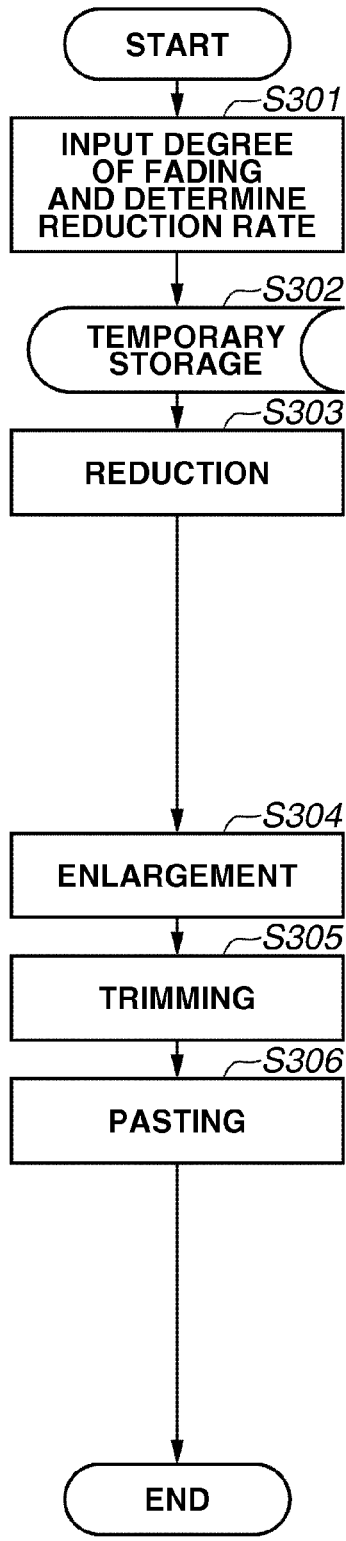
FIGS. 3A and 3B are flowcharts illustrating example procedures of processing that can be performed by the imaging apparatus according to an exemplary embodiment of the present invention.

FIG. 3A is a flowchart illustrating processing to be performed when a live image is displayed to determine structural outline of an image prior to shooting or recording of a still image or a moving image. In the live image display, the CPU 100 of the imaging apparatus performs dioramic special effect processing on a captured image and performs real-time display without recording processed images. The processing illustrated in the flowchart in FIG. 3A is executed under the control of the CPU 100.

When the live image is displayed, if processing performance and memory capacity available for the generation of a dioramic live image are comparable to those for a live image in a normal shooting mode or in a dioramic still image shooting mode, the display processing for the dioramic live image may delay due to reduction in a processing speed or the frame rate may decrease. Accordingly, preventing these inconveniences from occurring in the live image display is prioritized.

According to the present exemplary embodiment, if a dioramic shooting mode is designated, then in step S301, the CPU 100 inputs the degree of blur having been manually or automatically determined and determines a reduction ratio of an image based on the degree of blur. For example, a user can select the degree of blur between "strong" and "weak" and, if the selected degree of blur is "strong", the CPU 100 can set a larger reduction ratio. For example, the reduction ratio to be set is one eighth when the selected degree of blur is "strong" and is one quarter when the selected degree of blur is "weak." In the present exemplary embodiment, it is presumed that the selected degree of blur is "strong."

Next, in step S302, the CPU 100 controls the inner storage unit 108 to temporarily store image data of an input captured image. In step S303, the CPU 100 controls the image reduction unit 205 to reduce the image data based on the determined reduction ratio and controls the inner storage unit 108 to temporarily store the reduced image data.

According to an example method, the reduction processing according to the present exemplary embodiment is performed in such a manner that some pixels are simply thinned out according to a reduction ratio. In this case, as the selected degree of blur is "strong" (reduction ratio=1/8), the image reduction unit 205 performs processing for thinning seven pixels out of consecutive eight pixels. Any other reduction method, such as a bilinear method or a bicubic method, may also be employable.

Subsequently, in step S304, the CPU 100 controls the image enlargement unit 206 to perform enlargement processing (enlargement ratio=8) on the reduction-processed image data to restore an image having the original image size. According to the processing performed in step S304, image data of a blurred image having the same image size can be obtained, compared to the image data of the captured image.

Next, in step S305, the CPU 100 performs trimming on the image data of the captured image read out from the inner storage unit 108, and sends the trimmed image data to the image combination unit 207. In this case, an area to be trimmed is an area corresponding to an area 406 illustrated in FIG. 4C.

Then, in step S306, the image combination unit 207 positions and pastes the image having been trimmed in step S305 on the blurred image that has been enlarged in step S304. More specifically, when the captured image data is pasted, a composite ratio of the blurred image data to the captured image data is set to 0:1 in an area 405 near the center of the image. Further, the composite ratio to be set for the captured image becomes smaller if image data of the captured image is positioned farther from the area 405. On the contrary, the composite ratio to be set for the blurred image becomes larger if image data of the blurred image is positioned farther from the area 405. By setting the composite ratio as described above, image data can be smoothly mixed and a border portion of the pasted areas will not stand out.

Executing the above-described processing for each frame of an input captured image can realize the display of a real-time live image that blurs at the upper and lower portions while maintaining original resolution feeling in the central portion. The above-described method is inferior to a method employed for the still image shooting operation, which will be described below, in invisibility of a dioramic image. However, the above-described method is superior to the method employed for the still image shooting operation in that a processing load of the digital signal processing unit 107 and usage memory capacity of the inner storage unit 108 can be reduced greatly. Accordingly, the imaging apparatus according to the present exemplary embodiment can realize an appropriate dioramic image display while maintaining the frame rate of a live image in the normal shooting mode. A user can accurately perform structural outline and can perform shooting and recording of dioramic still images without missing photo opportunity.

Figure 3B:
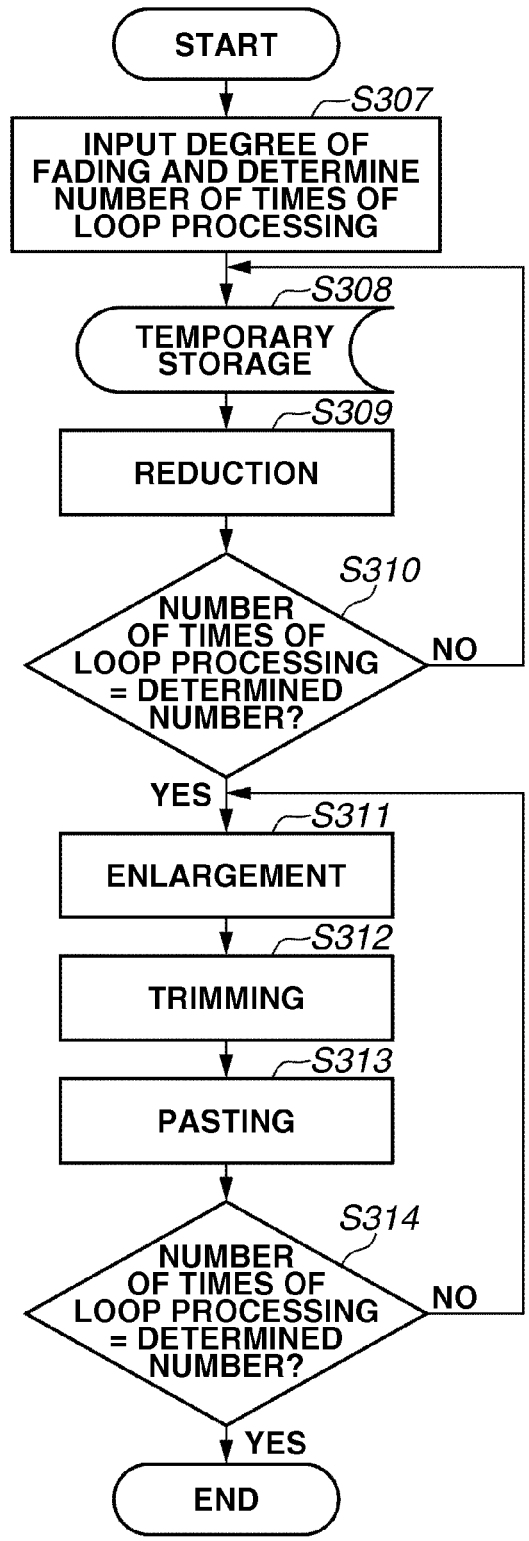

FIG. 3B is a flowchart illustrating processing to be performed in the still image shooting mode. The operation in the still image shooting mode is performed so as to prioritize reduction of unnaturalness in the combination processing, namely visibility, over the processing speed.

If a shutter button is pressed during the live image processing illustrated in FIG. 3A, then in step S307, the CPU 100 inputs the degree of blur having been manually or automatically determined and determines a number of times of loop processing to be performed in the reduction processing based on the degree of blur having been input. As described above, in the present exemplary embodiment, the user can select the degree of blur between "strong" and "weak." The number of times of the loop processing is set to be a larger value when the degree of blur selected by the user is "strong."

A live image is to be displayed on the image display unit 110 before (i.e., immediately before) the shutter button is pressed is similar to an image obtained in a still image shooting operation in a state of blur as a whole image. Accordingly, with respect to a quality of image, the number of times of the loop processing to be set according to the degree of blur (i.e., "strong" or "weak") has a relationship with the reduction ratio in the reduction processing performed in step S303 in the live image display mode.

More specifically, the reduction ratio in the reduction processing according to the present exemplary embodiment is set to a fixed value (=½). Therefore, if the degree of blur is "strong", the CPU 100 sets the number of times of the loop processing to three times (which corresponds to one-eighth reduction as a whole). If the degree of blur is "weak", the CPU 100 sets the number of times of the loop processing to two times (which corresponds to one-quarter reduction as a whole).

If the shutter button is pressed, then in step S308, the CPU 100 causes the inner storage unit 108 to temporarily store input image data (i.e., original data). Then, in step S309, the CPU 100 causes the image reduction unit 205 to reduce the image data to have a size determined by the fixed value and causes the inner storage unit 108 to temporarily store the reduced image data.

The reduction processing according to the present exemplary embodiment is performed using a method that some pixels are simply thinned out that is a similar method used in the above-described live image processing. As the fixed value of the image reduction unit 205 is ½, the image reduction unit 205 performs processing for thinning one pixel out of consecutive two pixels.

Next, in step S310, the CPU 100 determines whether the number of times of the loop processing of the executed reduction processing has reached the number of times of the loop processing determined in step S307. If it is determined that the number of times of the executed loop processing is less than the predetermined number of times (NO in step S310), the processing returns to step S308 in which the CPU 100 causes the inner storage unit 108 to temporarily store the reduced image data. Then, in step S309, the CPU 100 reads the reduced image data stored in step S308 and causes the image reduction unit 205 to reduce the image again to have a size determined by the fixed value.

If it is determined that the number of times of the executed loop processing has reached the predetermined number of times (YES in step S310), the CPU 100 terminates the reduction processing. In the present exemplary embodiment, the data stored in the inner storage unit 108 at the time when the reduction processing is completed includes the image data of the captured image (i.e., original data), the image data of the one-half reduced image, the image data of the one-quarter reduced image, and the image data of the one-eighth reduced image.

Next, in step S311, the CPU 100 reads the image data of the most reduced image (i.e., an image in the lowermost layer, more specifically, the image data of the one-eighth reduced image in the present exemplary embodiment) from the inner storage unit 108 and causes the image enlargement unit 206 to enlarge the read image data to have a size determined by a reciprocal of the fixed value (enlargement ratio=2). Then, the CPU 100 stores the image data of the enlarged image in the inner storage unit 108. The above-described processing can generate image data of a blurred image which has an image size comparable to an upper layer (i.e., one-quarter reduced image) but further blurred compared to the reduced image thereof.

Next, in step S312, the CPU 100 performs trimming on the image data of the reduced image in the upper layer (i.e., the one-quarter reduced image) read out from the inner storage unit 108, and sends the trimmed image data to the image combination unit 207. In this case, the area to be trimmed is an area corresponding to an area 403 illustrated in FIG. 4A.

Next, in step S313, the CPU 100 causes the image combination unit 207 to paste the trimmed image on the blurred image obtained in step S311 (having a size similar to the one-quarter reduced image). More specifically, the image combination unit 207 performs processing for combining the trimmed image with the blurred image at the composite ratio 1:0. In this case, similar to that in the live image, a border portion of the pasted areas are smoothly mixed to prevent the border portion from standing out. The CPU 100 causes the inner storage unit 108 to store the obtained composite image.

In step S314, the CPU 100 determines whether the number of times of the executed loop processing has reached the predetermined number of times of the loop processing. If it is determined that the number of times of the executed loop processing is less than the predetermined number of times (NO in step S314), the CPU 100 repeats the above-described enlargement, trimming, and paste processing in steps S311 to S313. In this case, the image enlarged in the second loop processing is the composite image stored in step S313. Further, the area to be trimmed and combined in the reduced image of the upper layer (i.e., one-half reduced image) is an area corresponding to an area 402 illustrated in FIG. 4A.

In the present exemplary embodiment, the number of times of the loop processing to be performed is three times. Therefore, the composite image obtained after the enlargement processing in the third loop processing has an image size same as the captured image. Further, the area of the captured image to be trimmed and combined in the third loop processing is an area corresponding to an area 401 illustrated in FIG. 4A.

The above-described processing for successively narrowing the area each time the loop processing is repeated to paste the central area of an upper layer image can finally obtain a composite image having a stepwise blurring effect.

Figure 4A:
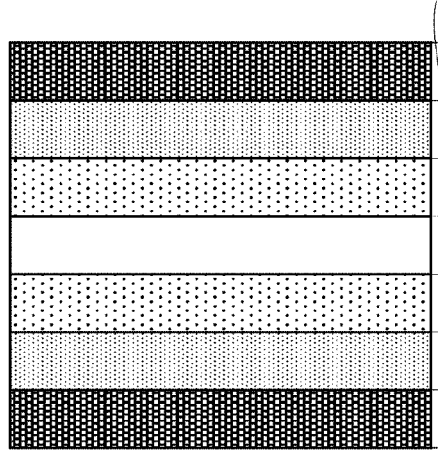
FIGS. 4A to 4D illustrate example of an effect that can be obtained by the imaging apparatus according to an exemplary embodiment of the present invention.
Figure 4B:
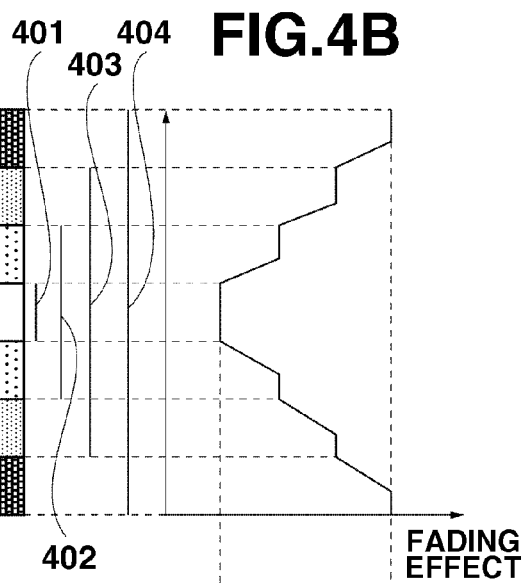

FIGS. 4A and 4B illustrate an example dioramic still image and its blurring effect that can be obtained according to the present exemplary embodiment.

FIG. 4A illustrates a relationship between a plurality of composite areas of blurred images. The area 401 is the most resolved area, i.e., an area in which the original captured image is pasted. The area 402 is an area which is obtained after the loop processing of the reduction processing is performed one time, i.e., a slightly blurred area. The area 403 is an area which is obtained after the loop processing of the reduction processing is performed two times, i.e., a more blurred area. An area 404 is an area which is obtained after the loop processing of the reduction processing is performed three times, i.e., the most blurred area.

As described in the processing procedure illustrated in FIG. 3B, the image reduction unit 205 performs the reduction processing three times to repeat the loop processing for successively reducing the entire image which relate to the area 401, the area 402, the area 403, and the area 404. Further, the storage capacity of the inner storage unit 108 performs the reduction processing is equivalent to four sheets of image data that are different in size.

Further, the area 403 is enlarged and pasted to the area 404. The obtained area is further enlarged and pasted to the area 402. The obtained area is further enlarged and pasted to the area 401. Therefore, the image enlargement unit 206 performs the enlargement processing three times, and the image combination unit 207 performs the combination processing three times. Furthermore, the storage capacity of the inner storage unit 108 performs the enlargement processing is equivalent to four sheets of image data.

More specifically, the CPU 100 causes the image reduction unit 205 to reduce a first image stored in the inner storage unit 108 to have a size determined by a predetermined fixed value (i.e., a predetermined magnification). Then, the CPU 100 stores the reduced image as a second image in the inner storage unit 108. Further, the CPU 100 causes the image reduction unit 205 to reduce the second image to obtain a third image and stores the obtained third image in the inner storage unit 108. The CPU 100 causes the image reduction unit 205 and the inner storage unit 108 to repeat the above-described processing until an n-th image (n is an integer that satisfies a condition n≧3) is stored in the inner storage unit 108.

Subsequently, the CPU 100 causes the image enlargement unit 206 to enlarge the n-th image to have a size determined by the reciprocal of the fixed value (i.e., a predetermined magnification). Then, the CPU 100 causes the image combination unit 207 to combine the obtained enlarged image with an (n−1)th image to generate a first composite image. Further, the CPU 100 causes the image enlargement unit 206 to enlarge the first composite image at the predetermined magnification to obtain a further enlarged image and causes the image combination unit 207 to combine the enlarged image with an (n−2)th image stored in the inner storage unit 108 to generate a second composite image. The CPU 100 causes the image enlargement unit 206 and the image combination unit 207 to repeat the above-described processing until an (n−1)th composite image is generated. The finally generated image obtained through the above-described processing is a recording image to be stored in the still image shooting mode.

Further, in the case where the above-described blurring setting is performed to capture a still image, a live image (i.e., a display image) is generated in the following manner before shooting the still image. More specifically, the image reduction unit 205 reduces the first image stored in the inner storage unit 108 to have an image size comparable to the n-th image to generate a reduced image. Then, the generated reduced image is enlarged to have a size comparable to the first image and is combined with the first image to generate an image to be used for the live image.

FIG. 4B is a graph corresponding to FIG. 4A, in which an ordinate axis represents a vertical direction of an image and an abscissa axis represents a degree of visible fading effect. As understood from the graph in FIG. 4B, the blurring effect is applied in a stepwise manner from the resolved area to the blurred area and areas are smoothly mixed at the border thereof so that the variation of the blurring effect can be recognized as natural.

As described above, the selected degree of blur is "strong" in the present exemplary embodiment. Therefore, the loop processing is repeated three times. However, the number of times of the loop processing is variable depending on a required amount of blur. For example, if the degree of blur selected by the user is "weak", the number of times of the loop processing is set to two times.

Figure 4C:
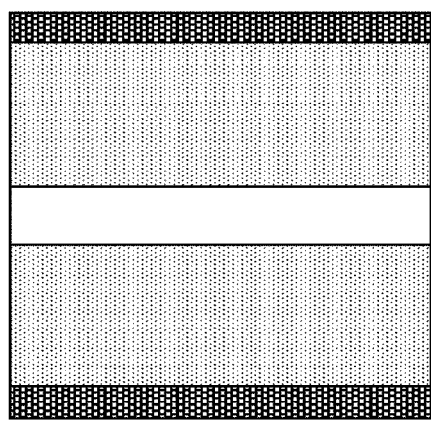
Figure 4D:
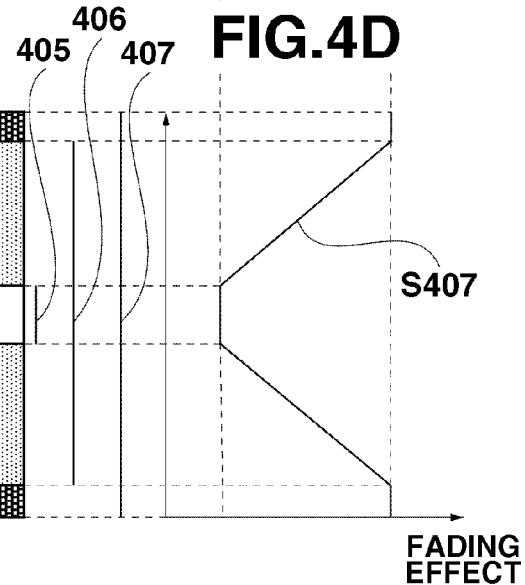

FIGS. 4C and 4D illustrate an example of the dioramic live image in relation to its blurring effect that can be obtained according to the present exemplary embodiment.

FIG. 4C illustrates a relationship between a plurality of composite areas of blurred images. The area 405 is the resolved area, i.e., an area where the original captured image is pasted. The area 406 is a blurred area that is obtained through the reduction, enlargement, and combination processing illustrated in FIG. 3A. The amount of blur can be determined based on the reduction ratio as described above with reference to the processing procedure illustrated in FIG. 3A.

FIG. 4D is a graph corresponding to FIG. 4C, in which the ordinate axis represents the vertical direction of an image and the abscissa axis represents the degree of visible blurring effect. As illustrated in the graph, the visible blurring effect smoothly changes from the resolved area to the blurred area in such a way as to smoothly mix the original data with the blurred image data in an area 407.

Further, the range where the resolved area is mixed with the border of the blurred area is set to be a wider range similar to the stepwise range for the still image. More specifically, the range between the area 406 and the area 407 illustrated in FIG. 4C is narrower than the range between the area 403 and the area 404 illustrated in FIG. 4A. However, the range illustrated in FIG. 4C has a blurring effect similar to that can be obtained through the smooth mixing processing applied to the bordered areas illustrated in FIG. 4A. Namely, the variation in blur (i.e., gradient) is similar to that illustrated in FIG. 4A. Through the above-described processing, the blurring effect applied to a live image becomes similar to the blurring effect applied to an actually captured image.

The image illustrated in FIG. 4C is different from the image illustrated in FIG. 4A in that the change of the blurring effect is not stepwise. Thus, when the image illustrated in FIG. 4C is viewed, sufficient dioramic effects may not be obtained. However, the number of times of the reduction processing performed by the image reduction unit 205 is only one time. Therefore, the memory capacity that the inner storage unit 108 uses for the reduction processing is equivalent to two sheets of image data that are different in size. Further, the number of times of the enlargement processing performed by the image enlargement unit 206 is only one time. The number of times of the combination processing performed by the image combination unit 207 is also only one time. Therefore, the memory capacity that the inner storage unit 108 uses for the enlargement processing and the combination processing is equivalent to two sheets of image data.

Therefore, real-time confirmation of dioramic effects is feasible even in the display of a live image that requires a processing speed of several tens of frames per second without causing any delay in the display processing and without lowering the frame rate. Accordingly, the present exemplary embodiment can bring an effect of solving the above-described inconvenience. More specifically, the imaging apparatus can perform a dioramic still image shooting appropriately during the display of a live image without missing photo opportunity.

In the present exemplary embodiment, a captured image and a single blurred image are used to generate a diorama image in the live image display. However, a similar effect can be obtained using blurred images which are one or more but not exceeding the number of blurred images used in the still image shooting mode. For example, a one-quarter reduced image can be additionally generated. In this case, the weighting in combination changes in order of the captured image, the one-quarter reduced image, and the one-eighth reduced image successively from the center of an image toward the outer edge thereof.

Further, according to the present exemplary embodiment, the processing for generating a live image and an actually captured image (i.e. a recording image) is performed in parallel with the processing for generating blurred images using reduction and enlargement. However, the method for generating each image is not limited to the above-described method. Another employable method may include generating a plurality of blurred images, which are differentiated in the degree of blur, from a captured image. In this case, the image generation processing is performed in such a manner that the number of blurred images used to generate a live image (i.e., a display image) is smaller than the number of blurred images used to generate an actually captured image (i.e., a recording image).

The imaging apparatus described in the first exemplary embodiment prioritizes the frame rate and the processing load over the image quality in the generation of a dioramic live image.

A problem occurring in the moving image shooting or recording processing is similar to that in the live image display processing. Therefore, the processing procedure in the live image display mode illustrated in FIG. 3A can be directly used for the moving image shooting processing.

Further, it is useful to provide a plurality of dioramic moving image shooting modes which include a frame rate priority mode to perform the processing procedure illustrated in FIG. 3A and an image quality priority mode to perform the processing procedure illustrated in FIG. 3B. Thus, each user can select a desired one of these modes.

In the above-described exemplary embodiments, the dioramic image processing is an example of processing capable of bringing a special effect. However, the present invention can be applied to any other processing bringing special effects by combining a captured image with at least one of blurred images to obtain composite images differentiated in area.

In the above-described exemplary embodiments, the present invention is applied to an imaging apparatus. However, the present invention is not limited to the imaging apparatus described in the above-described exemplary embodiments and can also be applied to an image processing apparatus, such as a personal computer or a digital television which can input a captured image from an externally connected imaging apparatus. In this case, application software causing a computer to execute the above-described processing in respective steps illustrated in FIGS. 3A and 3B can be installed via a recording medium (e.g., compact disc read only memory (CD-ROM)) or acquired from an internet server accessible via a network.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-024600 filed Feb. 5, 2010, which is hereby incorporated by reference herein in its entirety

What is claimed is:

1. An apparatus that generates a display image to be displayed on a display unit and a recording image to be recorded in a recording unit based on a captured image obtained by an imaging unit, the apparatus comprising:
    a generation unit configured to generate a plurality of blurred images which are differentiated in a degree of blur from the captured image;
    a combination unit configured to combine the captured image with at least one of the generated blurred images to generate the display image and the recording image; and
    a control unit configured to control the generation unit and the combination unit such as to set a number of blurred images that are used to generate the display image to be smaller than a number of blurred images that are used to generate the recording image.

2. The apparatus according to claim 1, wherein the generation unit comprises:
    a reduction unit configured to perform reduction processing on the captured image; and
    an enlargement unit configured to perform enlargement processing on a reduced image to generate a blurred image which has an image size comparable to an original image.

3. The apparatus according to claim 1, wherein the combination unit is configured to change a degree of blur for each area of the display image by changing a composite ratio of each area of the display image.

4. The apparatus according to claim 3, wherein the composite ratio is a ratio of blurred image data to captured image data.

5. The apparatus according to claim 3, wherein the combination unit is configured to change the degree of blur for each area such that the recording image and the display image become similar in a blurring effect of each area.

6. An apparatus that records a still image and a moving image based on a captured image obtained by an imaging unit, the apparatus comprising:
    a generation unit configured to generate a plurality of blurred images which are differentiated in a degree of blur from the captured image;
    a combination unit configured to combine the captured image with at least one of the blurred images to generate the still image and the moving image;
    a control unit configured to control the generation unit and the combination unit such as to set a number of blurred images generated by the generation unit that are used to generate the moving image to be smaller than a number of blurred images that are used to generate the still image.

7. The apparatus according to claim 6, wherein the generation unit comprises:
    a reduction unit configured to perform reduction processing on the captured image; and
    an enlargement unit configured to perform enlargement processing on a reduced image to generate a blurred image which has an image size comparable to an original image.

8. A method for controlling an apparatus that generates a display image to be displayed on a display unit and a recording image to be recorded in a recording unit based on a captured image obtained by an imaging unit, the method comprising:
    generating a plurality of blurred images which are differentiated in a degree of blur from the captured image; and
    combining the captured image with at least one of the generated blurred images to generate the display image and the recording image;

wherein a number of the generated blurred images that are used to generate the display image is smaller than a number of the generated blurred images that are used to generate the recording image.

9. The method according to claim 8, further comprising:
performing reduction processing on the captured image; and
performing enlargement processing on a reduced image to generate a blurred image which has an image size comparable to an original image.

10. A method for controlling an apparatus that records a still image and a moving image based on a captured image obtained by an imaging unit, the method comprising:
generating a plurality of blurred images which are differentiated in a degree of blur from the captured image; and
combining the captured image with at least one of the generated blurred images to generate the still image and the moving image,
wherein a number of the generated blurred images that are used to generate the moving image is smaller than a number of the generated blurred images that are used to generate the still image.

11. A method for controlling an apparatus that generates a display image to be displayed on a display unit and a recording image to be recorded in a recording unit based on a captured image obtained by an imaging unit, the method comprising:
generating a plurality of blurred images which are differentiated in a degree of blur from the captured image; and
combining the captured image with the generated plurality of blurred images to generate the recording image and combining the captured image with a most-blurred image among the generated plurality of blurred images to generate the display image, wherein a number of the generated blurred images that are used to generate the display image is smaller than a number of the generated blurred images that are used to generate the recording image.

12. A method for controlling an apparatus that generates a display image to be displayed on a display unit and a recording image to be recorded in a recording unit based on a captured image obtained by an imaging unit, wherein
the apparatus comprises:
a reduction unit configured to reduce an image obtained from the recording unit;
an enlargement unit configured to enlarge the reduced image; and
a combination unit configured to combine the enlarged image with an image which has a same image size recorded in the recording unit, and
the method comprises:
performing first reduction processing to reduce a first image recorded in the recording unit at a predetermined magnification to obtain a second image and recording the second image in the recording unit and further reducing the second image to obtain a third image and recording the third image in the recording unit, wherein the first reduction processing is repeated until an n-th image where n is an integer that satisfies a condition $n \geq 3$, is recorded in the recording unit; and
performing first combination processing for causing the enlargement unit to enlarge the n-th image at the predetermined magnification to obtain an enlarged image and combining the obtained enlarged image with an $(n-1)$th image recorded in the recording unit to generate a first composite image and further enlarging the first composite image at the predetermined magnification to obtain a further enlarged image and combining the further enlarged image with an $(n-2)$th image recorded in the recording unit to generate a second composite image, wherein the first combination processing is repeated until an $(n-1)$th composite image is generated.

13. The method according to claim 12, further comprising:
performing second reduction processing to reduce the first image to have an image size similar to that of the n-th image; and
performing second combination processing for combining an image obtained by enlarging the reduced image generated by the second reduction processing to have a size similar to that of the first image with the first image.

14. The method according to claim 13,
wherein the image generated by the first combination processing is used for the recording image and the image generated by the second combination is used for the display image.

15. The apparatus according to claim 1, wherein the recording unit is an external storage device.

16. The apparatus according to claim 1, wherein the display image is displayed in the display unit as a live image.

17. The apparatus according to claim 1, wherein the generation unit generates the blurred image by performing reduction processing on the captured image and enlargement processing on the reduced image.

* * * * *